United States Patent
Wang et al.

(10) Patent No.: US 11,467,558 B2
(45) Date of Patent: Oct. 11, 2022

(54) INTERRUPTION RECOVERY METHOD FOR MACHINE TOOL MACHINING FILE AND MACHINE TOOL APPLYING SAME

(71) Applicant: Siemens Aktiengesellschaft, Munich (DE)

(72) Inventors: Wei Wang, Nanjing (CN); Shun Feng Hu, Nanjing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 214 days.

(21) Appl. No.: 16/642,064

(22) PCT Filed: Aug. 28, 2018

(86) PCT No.: PCT/EP2018/073098
§ 371 (c)(1),
(2) Date: Feb. 26, 2020

(87) PCT Pub. No.: WO2019/042976
PCT Pub. Date: Mar. 7, 2019

(65) Prior Publication Data
US 2020/0301394 A1 Sep. 24, 2020

(30) Foreign Application Priority Data
Aug. 28, 2017 (CN) .................. 201710749266.X

(51) Int. Cl.
G06F 11/10 (2006.01)
G05B 19/4067 (2006.01)
G06F 16/23 (2019.01)

(52) U.S. Cl.
CPC ...... *G05B 19/4067* (2013.01); *G06F 11/1004* (2013.01); *G06F 16/2365* (2019.01); *G05B 2219/50104* (2013.01)

(58) Field of Classification Search
CPC ...... G06F 11/08; G06F 11/10; G06F 11/1004; G06F 11/1096; G06F 11/1048;
(Continued)

(56) References Cited

U.S. PATENT DOCUMENTS

| | | | | |
|---|---|---|---|---|
| 4,370,705 A | * | 1/1983 | Imazeki | G05B 19/4067 483/1 |
| 5,497,494 A | * | 3/1996 | Combs | G06F 11/1441 713/323 |

(Continued)

FOREIGN PATENT DOCUMENTS

| | | |
|---|---|---|
| CN | 101656949 A | 2/2010 |
| CN | 101764671 A | 6/2010 |

(Continued)

OTHER PUBLICATIONS

Wikipedia's G-Code historical version published Jul. 29, 2019 https://en.wikipedia.org/w/index.php?title=G-code&oldid=792927801 (Year: 2019).*

(Continued)

*Primary Examiner* — Joseph O Schell
(74) *Attorney, Agent, or Firm* — Harness, Dickey & Pierce, P.L.C.

(57) ABSTRACT

Provided are an interruption recovery method for a machine tool machining file and a machine tool applying the method. The interruption recovery method includes: generating first check information when a machine tool machining file is executed, the machine tool machining file being stored in an external memory; generating second check information when the machine tool machining file is re-executed after an interruption occurs; comparing the first check information and the second check information to determine whether the machine tool machining file is changed before and after the interruption; and recovering the execution of the machine tool machining file when the first check information matches (Continued)

the second check information. By generating and comparing the check information before and after the interruption to verify the integrity and consistency of data of the machine tool machining file, the machine tool machining can be carried out accurately and unerringly.

22 Claims, 2 Drawing Sheets

(58) Field of Classification Search
CPC ........ G06F 21/57; G06F 21/575; G06F 21/64; G06F 16/68; G06F 9/4418; G05B 2219/50104
See application file for complete search history.

(56) References Cited

U.S. PATENT DOCUMENTS

| | | | | |
|---|---|---|---|---|
| 5,715,464 | A * | 2/1998 | Crump | G06F 1/3203 |
| | | | | 713/323 |
| 5,793,635 | A * | 8/1998 | Niwa | G05B 19/4155 |
| | | | | 700/192 |
| 6,816,872 | B1 | 11/2004 | Squibb | |
| 9,268,941 | B1 * | 2/2016 | Akdemir | G06F 21/64 |
| 2002/0073358 | A1 * | 6/2002 | Atkinson | G06F 11/1004 |
| | | | | 714/21 |
| 2007/0016797 | A1 * | 1/2007 | Shishikura | G07F 19/207 |
| | | | | 713/187 |
| 2011/0185417 | A1 | 7/2011 | Zhou et al. | |
| 2011/0212761 | A1 * | 9/2011 | Paulsen | G07F 17/3202 |
| | | | | 345/522 |
| 2012/0296878 | A1 | 11/2012 | Nakae et al. | |
| 2014/0325197 | A1 * | 10/2014 | Lewis | G06F 9/4418 |
| | | | | 713/2 |
| 2015/0350278 | A1 * | 12/2015 | Isbjornssund | G05B 19/4099 |
| | | | | 700/98 |
| 2017/0228543 | A1 * | 8/2017 | Jarmany | G06F 9/4401 |
| 2018/0019876 | A1 * | 1/2018 | Moss | H04L 9/0643 |
| 2018/0267518 | A1 * | 9/2018 | Hassman | G05B 19/4183 |

FOREIGN PATENT DOCUMENTS

| | | |
|---|---|---|
| CN | 102621933 A | 8/2012 |
| CN | 103685489 A | 3/2014 |
| CN | 104090796 A | 10/2014 |
| CN | 104363271 A | 2/2015 |
| CN | 105187551 A | 12/2015 |
| CN | 106022107 A | 10/2016 |
| EP | 0027317 A2 | 4/1981 |
| EP | 2104013 A2 | 9/2009 |

OTHER PUBLICATIONS

Chinese Office Action dated Aug. 17, 2021.
Office Action for Chinese Patent Application No. 201710749266.X dated Jan. 13, 2022.
International Search report dated Nov. 27, 2018.

* cited by examiner

INTERRUPTION RECOVERY METHOD FOR MACHINE TOOL MACHINING FILE AND MACHINE TOOL APPLYING SAME

PRIORITY STATEMENT

This application is the national phase under 35 U.S.C. § 371 of PCT International Application No. PCT/EP2018/073098 which has an International filing date of Aug. 28, 2018, which designated the United States of America and which claims priority to Chinese patent application no. CN 201710749266.X filed Aug. 28, 2017, the entire contents of each of which are hereby incorporated herein by reference.

FIELD

Embodiments of the invention generally relate to an interruption recovery method for a machine tool machining file and a machine tool applying the method, in particular to a machine tool in which a machine tool machining file is stored in an external memory with respect to the machine tool.

BACKGROUND

The memory space of a machine tool machining system is generally small. Due to the limitation of the memory space of the machine tool, for a relatively large machining file program, the machine tool cannot completely store the machining file program in the memory and then carry out the machining. This requires the machine tool to be connected to an external memory and read the machining file from the external memory. However, when the connection of a hardware device of the external memory fails or the network environment where the machine tool is located is unstable, the data transmission connection between the machining file and the machine tool may be interrupted, and the occurrence of the interruption failure may seriously affect the subsequent machining operations of the machine tool.

When the interruption occurs, the machine tool will stop running, and when the machine tool needs to continue to work, there are two existing methods. One is to restart all the programs, and then run the program from the beginning, that is, the machining program starts from the beginning of the program, causing repetitive work, and affecting the machining efficiency and machining quality of a workpiece; and the other is to manually record, when the interruption occurs, the current position of the running machining file program, and the current coordinate values and spindle speed value of the machine tool, and manually recover the current coordinate values and spindle speed value of the machine tool to continue to run the remaining programs, but the operation of such a manual interruption recovery is highly specialized, cumbersome and time-consuming.

Moreover, none of the prior art considers the possible inconsistency and incompleteness between the machining file after the interruption and the machining file before the interruption. For example, when the machining is recovered, the machine tool may read a wrong machining file, or the original machining file may be damaged, lose data, or be modified online by other users, with the result that the program executed after the interruption of the machine tool is different from the original program, and this will cause a numerically-controlled machine tool to execute a wrong action, which is extremely dangerous.

SUMMARY

Embodiments of the present invention provide an interruption recovery method for a machine tool machining file and a machine tool applying the method. At least one embodiment of the present invention aims to ensure that the machining process of the machine tool is safe and reliable in the event of a transmission interruption failure of the machine tool machining file.

In an embodiment, an interruption recovery method for a machine tool machining file comprises: generating first check information when a machine tool machining file is executed, wherein the machine tool machining file is stored in an external memory with respect to a machine tool; generating second check information when the machine tool machining file is re-executed after an interruption occurs; comparing the first check information and the second check information to determine whether the machine tool machining file is changed before and after the interruption; and recovering the execution of the machine tool machining file when the first check information matches the second check information. By generating and comparing the check information before and after the interruption to verify the integrity and consistency of data of the machine tool machining file, it is ensured that the machine tool machining can be carried out accurately and unerringly, and the machining process is always ensured to be safe and reliable in the event of a transmission interruption failure of the machining file.

In an embodiment, provided is a machine tool, which is adapted to be connected to an external memory having a machine tool machining file stored therein, the machine tool further comprising a control unit in data connection with the external memory, wherein the control unit is configured to generate first check information when the machine tool machining file is read from the external memory and executed; generate second check information when the machine tool machining file is re-executed after an interruption occurs; compare the first check information and the second check information to determine whether the machine tool machining file is changed before and after the interruption; and recover the execution of the machine tool machining file when the first check information matches the second check information.

BRIEF DESCRIPTION OF THE DRAWINGS

The foregoing characteristics, technical features, advantages, and implementations of the present invention are further described below in an explicit and comprehensible manner by way of the description of preferred embodiments and with reference to the accompanying drawings, in which.

DETAILED DESCRIPTION OF EMBODIMENTS

Figure 1:
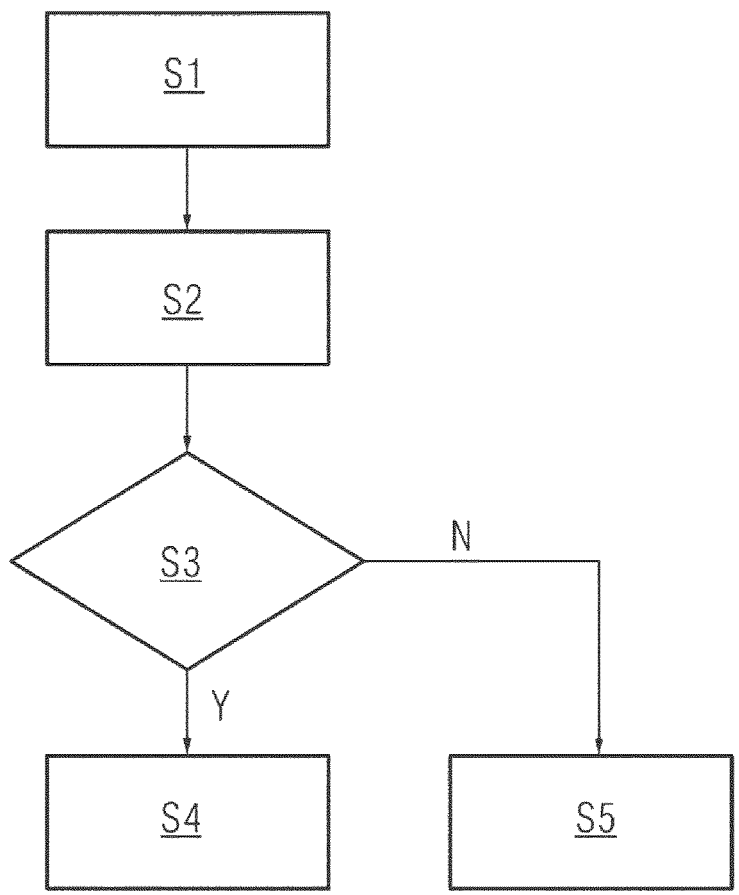
FIG. 1 schematically shows a flow chart of an interruption recovery method for a machine tool machining file according to an embodiment of the present invention.

In an embodiment, an interruption recovery method for a machine tool machining file comprises: generating first check information when a machine tool machining file is executed, wherein the machine tool machining file is stored in an external memory with respect to a machine tool; generating second check information when the machine tool machining file is re-executed after an interruption occurs;

comparing the first check information and the second check information to determine whether the machine tool machining file is changed before and after the interruption; and recovering the execution of the machine tool machining file when the first check information matches the second check information. By generating and comparing the check information before and after the interruption to verify the integrity and consistency of data of the machine tool machining file, it is ensured that the machine tool machining can be carried out accurately and unerringly, and the machining process is always ensured to be safe and reliable in the event of a transmission interruption failure of the machining file.

In an embodiment, alarm information is issued when the first check information does not match the second check information. The user is notified in a timely manner of the error information, so as to take appropriate actions in time.

In an embodiment, between the step of generating the first check information and the step of generating the second check information, the method further comprises: recording and storing an interruption position of the machine tool machining file, wherein the step of recovering the execution of the machine tool machining file when the first check information matches the second check information further comprises: executing a subsequent machine tool machining file from the interruption position. It is possible for the machine tool to continue to perform machining at the position where it stopped before the interruption, thereby greatly saving on time and improving the machining efficiency.

In an embodiment, the interruption position of the machine tool machining file is determined according to a code offset of a program in the machine tool machining file.

In an embodiment, the machine tool machining file is divided into at least two program segments in order from the beginning to the end, and the same segmentation mode is used before and after the interruption; and wherein the first check information refers to a first check code generated for all the program segments of the machine tool machining file before the interruption; the second check information refers to a second check code generated for all or part of the program segments of the machine tool machining file after the interruption; the first check code is compared with the second check code to determine whether the program segment after the interruption position of the machine tool machining file changes before and after the interruption; and the subsequent machine tool machining file is executed from the interruption position when the first check code matches the second check code. As long as the content after the interruption position is kept consistent with the original file, the machine tool can continue to recover the execution of the machining operation from the interruption position, thereby improving the machining efficiency.

In an embodiment, the first check code is compared with the second check code sequentially backward from the interruption position. Even if a check value before the interruption position changes, there is no need to compare the check value, thereby saving on time.

In an embodiment, the second check code is generated for the program segment in which the interruption position is located and all the subsequent program segments of the machine tool machining file after the interruption. For the machine tool machining file after the interruption occurs, only the program segment thereof after the interruption position needs to be checked and operated, thereby greatly reducing the amount of operation and the time required for the check operation.

In an embodiment, the first check code is compared with the second check code in a reverse cyclic order.

In an embodiment, the first check information comprises identification information about the machine tool machining file, the second check information comprises identification information about a machine tool machining file to be executed that is re-read after the interruption occurs, and the first check information is compared with the second check information to determine whether the same machine tool machining file is re-executed, wherein the identification information comprises a file name and/or a file path. The automatic identification method improves the efficiency of production and machining, and is beneficial to further verify the consistency and accuracy of the machine tool machining files before and after the interruption, thereby ensuring that the machining process of the machine tool is accurate and unerring.

In an embodiment, the check information is generated by using any one of a cyclic redundancy check (CRC), a hash algorithm, and an MD5 algorithm.

In an embodiment, the external memory includes at least one of a USB flash disk, a network cloud disk, a computer, a server, and a mobile communication device.

In an embodiment, provided is a machine tool, which is adapted to be connected to an external memory having a machine tool machining file stored therein, the machine tool further comprising a control unit in data connection with the external memory, wherein the control unit is configured to generate first check information when the machine tool machining file is read from the external memory and executed; generate second check information when the machine tool machining file is re-executed after an interruption occurs; compare the first check information and the second check information to determine whether the machine tool machining file is changed before and after the interruption; and recover the execution of the machine tool machining file when the first check information matches the second check information.

In order to achieve a clearer understanding of the technical features, objectives and effects of the present invention, the specific implementation methods of the present invention are described with reference to the accompanying drawings, and in the drawings, the same reference signs denote the same parts. For a plurality of identical constituent parts, one of which is sometimes marked with a symbol, and the symbols of the other parts are omitted.

The various figures that are discussed below, and the various embodiments that are used to describe the principles of the present disclosure in this patent document are merely illustrative and should not be construed as limiting the scope of the present disclosure. Those skilled in the art will appreciate that the principles of the present disclosure may be implemented in any appropriately arranged device. Various innovative teachings of the present application will be described with reference to exemplary non-limiting embodiments.

The external memory for the machine tool may be, for example, one or more of a USB flash disk, a network cloud disk, a computer, a server, or a mobile communication device, and a machine tool machining file is stored in the external memory. When the machining operation is executed, the machine tool reads a program of the machining file from the external memory. Sometimes, factors such as the poor connection of the USB interface or the unstable network environment will cause a connection failure between the machine tool and the external memory, causing the interruption of the data transmission. When the data transmission between the machine tool machining file stored in the external memory and the machine tool is interrupted, the machine tool provided in the present invention automatically performs an interruption recovery method.

FIG. 1 schematically shows a flow chart of an interruption recovery method for a machine tool machining file according to an embodiment of the present invention. In this embodiment, the interruption recovery method for the machine tool machining file mainly comprises five steps S1-S5. In step S1, first check information is generated for the machine tool machining file before the interruption occurs; in step S2, second check information is generated for the machine tool machining file after the interruption occurs; in step S3, the first check information is compared with the second check information to determine whether the machine tool machining file changes before and after the interruption; and when the first check information matches the second check information, step S4 is executed to recover the execution of the machine tool machining file; otherwise, when the first check information does not match the second check information, step S5 is executed to issue alarm information. By generating and comparing the check information before and after the interruption to verify the integrity and consistency of data of the machining file, it is ensured that the machine tool machining can be carried out accurately and unerringly, and the machining process is always ensured to be safe and reliable in the event of a transmission interruption failure of the machining file.

Figure 2:
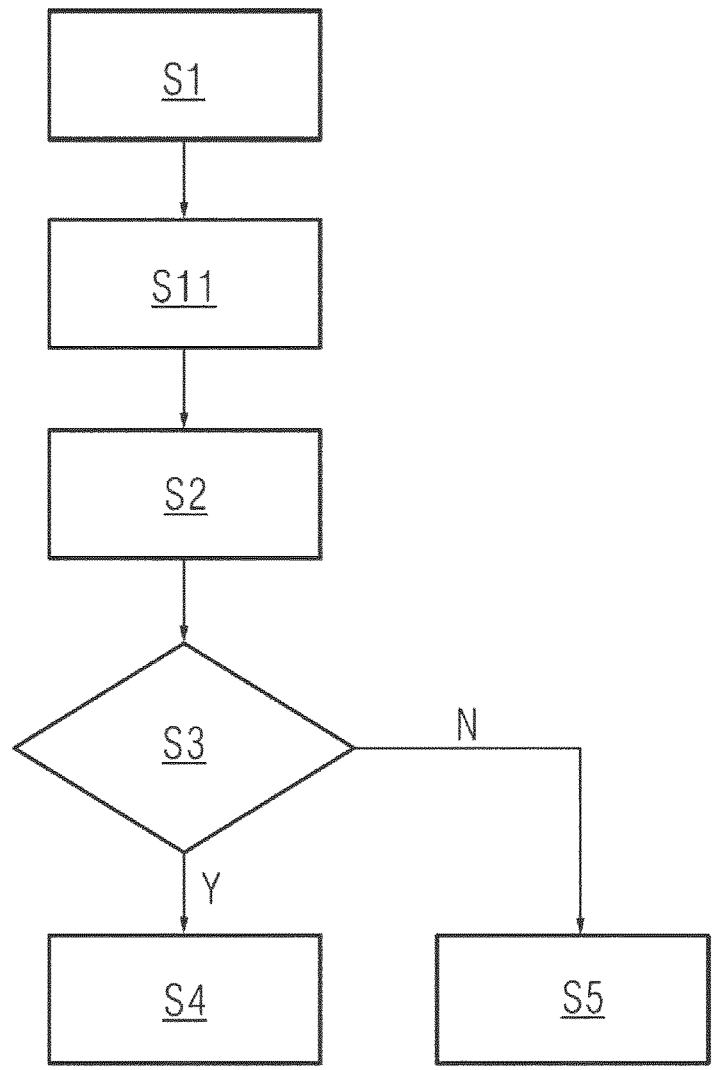
FIG. 2 schematically shows a flow chart of an interruption recovery method for a machine tool machining file according to a further embodiment of the present invention.

FIG. 2 schematically shows a flow chart of an interruption recovery method for a machine tool machining file according to a further embodiment of the present invention. There is also step S11 between step S1 and step S2, step S11 being capable of recording and storing a position at which the machine tool machining file is interrupted, and step S4 further comprises executing the subsequent machine tool machining file from the interruption position.

In an embodiment, once the machine tool executes one line of program, an offset of the line of program relative to the starting point of the machine tool machining file is automatically recorded, the value of the offset is stored in a control system of the machine tool, and the value of the offset is updated in real time according to the actual execution of the program of the machine tool machining file. It is also possible to determine where the interruption occurs by looking at the offset last updated before the interruption occurs. Alternatively, in a further embodiment, a signal for reading an interruption position is triggered only when an interruption of the machine tool machining file occurs, and the control system of the machine tool then records and stores the interruption position. The program of the machine tool can be realized by using, for example, a G code, which G code is a machining instruction recognizable by the machine tool, and the position at which the machine tool is interrupted can be determined by a code offset of the machining instruction in the machining file. In this way, when the machine tool re-establishes the data connection with the external memory and the condition for recovering the execution of the machine tool machining file is satisfied, the machine tool machining file automatically moves to the interruption position according to the code offset, and the remaining programs in the machine tool machining file are run. That is to say, the subsequent program of the machine tool machining file can be executed from the interruption position, and there is no need to re-run the programs of the entire machining file from the starting point of the machining file, thereby greatly saving on time and improving the machining efficiency.

The check information for the machine tool machining file can be presented in the form of a check code. For the verified file, there is only one unique check code. If the file is modified, the check code of the file will also change. The check code can be generated by way of various calculation methods, for example, a cyclic redundancy check (CRC) algorithm can be used to obtain the check information by way of calculation, and the data of the machine tool machining file is XORed to generate a remainder. Alternatively, in a further embodiment, a hash function may be used to perform a hash transform on a byte string in the machining file, and the byte string of any length is mapped into a large integer of a certain length. Alternatively, in a yet further embodiment, an MD5 algorithm may be used, which MD5 algorithm maps a byte string of any length into a 128-bit large integer, and for the data of any length, the length of the calculated MD5 check code is fixed.

In an embodiment, the check information may be generated for all the contents of the entire machine tool machining file, that is, the operation is performed on all fields of the machine tool machining file to generate a check value. When the machine tool initially executes the machine tool machining file, a check value is generated for all the contents of the machine tool machining file at that time, and is stored in a machine tool system; after the interruption occurs, when the machine tool re-establishes the data connection with the external memory, the machine tool machining file after the interruption occurs is read again, and a check value is generated for all the contents of the machine tool machining file at this time; and the check values before and after the interruption occurs are compared to determine whether the values of the check values are the same, and if so, it means that the two match, which means that all the contents of the machine tool machining file have not changed before and after the interruption occurs, and the machine tool can continue to execute the machine tool machining file and recover the machining.

In a further embodiment, all the contents of the machine tool machining file may be sequentially divided into a plurality of program segments from the beginning to the end, and the same segmentation mode is used before and after the interruption occurs, with a corresponding check value being generated for the contents of each program segment. By way of example, the machine tool machining file is first sequentially divided into N program segments from the beginning to the end, and one check value is generated for each program segment, so that the resulting total N check values form the first check code (A1, A2, . . . An), and each check value in the first check code is in one-to-one correspondence with the respective program segment. After the interruption occurs, when the machine tool re-establishes the data connection with the external memory, a check value can be generated for each program segment in the machine tool machining file after the interruption occurs, so that the resulting total N check values form the second check code (B1, B2, . . . Bn), and each check value in the second check code is in one-to-one correspondence with the respective program segment of the machine tool machining file after the interruption occurs. Assuming that when the interruption occurs, the program code being executed in the machine tool is located in the i-th program segment, that is, the interruption position falls in the i-th program segment, then, when the machine tool machining file is re-executed after the interruption occurs, the check value generated for the i-th program segment of the machine tool machining file after the interruption occurs is Bi. Since the same segmentation mode is used for the machine tool machining files before and after the interruption occurs, whether the i-th program segment of the machine tool machining file changes before and after the interruption can be determined only by comparing Bi with check value Ai in the first check code.

Similarly, for the programs (the (i+1)-th program segment . . . the N-th program segment) following the i-th program segment, whether the contents of the machine tool machining file backward from the interruption position change before and after the interruption can be determined only by comparing the corresponding check values in the first check code and the second check code. Once a pair of check values do not match in the process of comparison for the program segments backward from the i-th program segment, the comparison is stopped, and step S5 is immediately executed to issue alarm information. If the comparison is performed until the last program segment (the N-th program segment), it is found that each pair of check values (Ai and Bi, Ai+1 and Bi+1 . . . An and Bn) are the same, that is, if the first check code matches the second check code, step S4 is executed to recover the execution of the machine tool machining file.

Even if a check value before the interruption position changes, there is no need to make a comparison. Since as long as the content after the interruption position is kept consistent with the original file, the machine tool can continue to recover the execution of the machining operation from the interruption position without any impact on the machining. In this embodiment, for the machine tool machining file after the interruption occurs, only the program segment thereof after the interruption position needs to be calculated, thereby greatly reducing the amount of operation and the time required for the check operation.

Preferably, after the interruption occurs, for the machine tool machining file after the interruption, only a second check code (Bi, Bi+1, . . . Bn) is generated for the i-th program segment and each subsequent program segment thereof. In step S3, whether the program segment after the interruption position of the machine tool machining file changes before and after the interruption can be determined by comparing some of the check values of the first check code (Ai, Ai+1, . . . An) and the second check code (Bi, Bi+1, . . . Bn). In step S3, the first check code may be compared with the second check code in a reverse cyclic order, that is, make the comparison from the last check value of the check code, and if the values of An and Bn are the same, continue to compare the values of the previous check values An−1 and Bn−1, and if the values of the two are still the same, continue to compare the further previous check values, and so on, until the corresponding check values in the first check code and the second check code are all compared.

If each pair of check values (An and Bn, An−1 and Bn−1 . . . Ai and Bi) are the same, step S4 is executed to recover the execution of the machine tool machining file after the interruption; and once a pair of check values do not match in the reverse cycle order, the cyclic comparison is stopped, and step S5 is immediately executed to issue alarm information. In this embodiment, for the machine tool machining file after the interruption occurs, only the program segment thereof after the interruption position needs to be calculated, thereby greatly reducing the amount of operation and the time required for the check operation.

Optionally, the check information may comprise both the foregoing check code and identification information about the machine tool machining file, and the identification information about the machine tool machining file may be, for example, one or more of a file name, a file path, and other information. In a preferred embodiment, the identification information comprises both a file name and a file path. In step S1, the first check information may comprise identification information about the machine tool machining file; and in step S2, the second check information comprises identification information about a machine tool machining file to be executed, that is, re-read after the interruption occurs, and the identification information in the first check information and that in the second check information are compared to further determine whether the same machine tool machining file is re-executed.

The words "first" and "second" in the description herein are merely for convenience of distinguishing different objects, have no practical meaning, and do not indicate that there is a substantial difference between the two objects. The word "illustrative" represents "acting as an instance, example or description" herein, and any illustration and embodiment described as "illustrative" herein should not be construed as a more preferred or more advantageous technical solution.

A series of detailed descriptions listed above are merely specific descriptions regarding feasible embodiments of the present invention, but are not used to limit the scope of protection of the present invention. Any equivalent embodiment or alteration made without departing from the technical spirit of the present invention should all be contained within the scope of protection of the present invention.

The invention claimed is:

1. An interruption recovery method for a machine tool machining file, comprising:
generating first check information when a machine tool machining file is executed, the machine tool machining file being stored in an external memory with respect to a machine tool;
generating second check information when the machine tool machining file is re-executed after an interruption occurs;
comparing the first check information generated and the second check information generated to determine whether the machine tool machining file changes before and after occurrence of the interruption; and
recovering execution of the machine tool machining file upon the comparing indicating that the first check information generated matches the second check information generated.

2. The interruption recovery method of claim 1, wherein alarm information is issued upon the comparing indicating that the first check information generated does not match the second check information generated.

3. The interruption recovery method claim 1, wherein between the generating of the first check information and the generating of the second check information, further comprising:
recording and storing an interruption position of the machine tool machining file, wherein step the recovering further comprises: executing the machine tool machining file from the interruption position stored and recorded.

4. The interruption recovery method of claim 3, wherein the interruption position of the machine tool machining file is determined according to a code offset of a program in the machine tool machining file.

5. The interruption recovery method of claim 3, wherein the machine tool machining file is divided into at least two program segments in order from beginning to end, and a same segmentation mode is used before and after the interruption; and wherein the first check information refers to a first check code generated for all program segments of the machine tool machining file before the interruption;

the second check information refers to a second check code generated for all or part of the program segments of the machine tool machining file after the interruption;

the first check code is compared with the second check code to determine whether a program segment after the interruption position of the machine tool machining file changes before and after the interruption; and the machine tool machining file is executed from the interruption position when the comparing indicates that the first check code matches the second check code.

6. The interruption recovery method of claim 5, wherein the first check code is compared with the second check code sequentially backward from the interruption position.

7. The interruption recovery method of claim 5, wherein the second check code is generated for a program segment in which the interruption position is located and wherein the second check code is generated for all the program segments of the machine tool machining file after the interruption.

8. The interruption recovery method of claim 7, wherein the first check code is compared with the second check code in a reverse cyclic order.

9. The interruption recovery method of claim 1, wherein the first check information comprises identification information about the machine tool machining file, the second check information comprises identification information about a machine tool machining file to be executed that is read after the interruption occurs, and the first check information is compared with the second check information to determine whether the same machine tool machining file is re-executed, the identification information including at least one of a file name and a file path.

10. The interruption recovery method of claim 1, wherein the check information is generated by using any one of a cyclic redundancy check, a hash algorithm, and an MD5 algorithm.

11. The interruption recovery method of claim 1, wherein the external memory includes at least one of a U disk, a network cloud disk, a computer, a server, and a mobile communication device.

12. A machine tool, adapted to be connected to an external memory storing a machine tool machining file, the machine tool comprising:

a control unit in data connection with the external memory, the control unit being configured to generate first check information when the machine tool machining file is read from the external memory and executed, generate second check information when the machine tool machining file is re-executed after an interruption occurs, compare the first check information and the second check information to determine whether the machine tool machining file is changed before and after the interruption; and recover execution of the machine tool machining file upon, as a result of the compare, the first check information is being determined to match the second check information.

13. The machine tool of claim 12, wherein alarm information is issued upon, as a result of the compare, the first check information is being determined to not match the second check information.

14. The machine tool of claim 12, wherein the controller is further configured to record and store an interruption position of the machine tool machining file, and wherein the machine tool machining file is executed from the interruption position upon, as a result of the compare, the first check information is being determined to match the second check information.

15. The machine tool of claim 14, wherein the interruption position of the machine tool machining file is determined according to a code offset of a program in the machine tool machining file.

16. The machine tool of claim 14, wherein the machine tool machining file is divided into at least two program segments in order from beginning to end, and a same segmentation mode is used before and after the interruption; and wherein the first check information refers to a first check code generated for all the program segments of the machine tool machining file before the interruption;

the second check information refers to a second check code generated for all or part of the program segments of the machine tool machining file after the interruption;

the first check code is compared with the second check code to determine whether a program segment after the interruption position of the machine tool machining file changes before and after the interruption; and the machine tool machining file is executed from the interruption position when comparison of the first check code and the second check code indicates that the first check code matches the second check code.

17. The machine tool of claim 16, wherein the first check code is compared with the second check code sequentially backward from the interruption position.

18. The machine tool of claim 16, wherein the second check code is generated for a program segment in which the interruption position is located and all subsequent program segments of the machine tool machining file after the interruption.

19. The machine tool of claim 18, wherein the first check code is compared with the second check code in a reverse cyclic order.

20. The machine tool of claim 12, wherein the first check information includes identification information about the machine tool machining file, the second check information includes identification information about a machine tool machining file to be executed that is read after the interruption occurs, and the first check information is compared with the second check information to determine whether a same machine tool machining file is executed, the identification information including at least one of a file name and a file path.

21. The machine tool of claim 12, wherein the check information is generated by using any one of a cyclic redundancy check, a hash algorithm, and an MD5 algorithm.

22. The machine tool of claim 12, wherein the external memory includes at least one of a U disk, a network cloud disk, a computer, a server, and a mobile communication device.

* * * * *